No. 725,470. PATENTED APR. 14, 1903.
E. A. MOORE.
GAS WORKS VALVE.
APPLICATION FILED JUNE 5, 1902.
NO MODEL. 3 SHEETS—SHEET 1.

Witnesses
Franck L. Orrand
W. Parker Reinohl

Inventor
Edwin A. Moore
by D. J. Reinohl
Attorney

No. 725,470. PATENTED APR. 14, 1903.
E. A. MOORE.
GAS WORKS VALVE.
APPLICATION FILED JUNE 5, 1902.
NO MODEL. 3 SHEETS—SHEET 2.

Witnesses
Franck L. Durand
W. Parker Reinohl

Inventor
Edwin A. Moore
by D. C. Reinohl
Attorney

No. 725,470. PATENTED APR. 14, 1903.
E. A. MOORE.
GAS WORKS VALVE.
APPLICATION FILED JUNE 5, 1902.
NO MODEL. 3 SHEETS—SHEET 3.

Witnesses
Franck L. Ourand
W. Parker Reinohl

Inventor
Edwin A. Moore.
by D. L. Reinohl
Attorney

UNITED STATES PATENT OFFICE.

EDWIN A. MOORE, OF PHILADELPHIA, PENNSYLVANIA.

GAS-WORKS VALVE.

SPECIFICATION forming part of Letters Patent No. 725,470, dated April 14, 1903.

Application filed June 5, 1902. Serial No. 110,375. (No model.)

*To all whom it may concern:*

Be it known that I, EDWIN A. MOORE, a citizen of the United States, residing at Philadelphia, in the county of Philadelphia and State of Pennsylvania, have invented certain new and useful Improvements in Gas-Works Valves; and I do hereby declare the following to be a full, clear, and exact description of the invention, such as will enable others skilled in the art to which it appertains to make and use the same.

My invention relates, primarily, to gasworks, has especial reference to valves for controlling the passage of gas from its source of production, such as coke-ovens or retorts, to the coolers, has for its object economy in the construction of the valve, and consists in certain improvements in construction, which will be fully disclosed in the following specification and claims.

Figure 1:
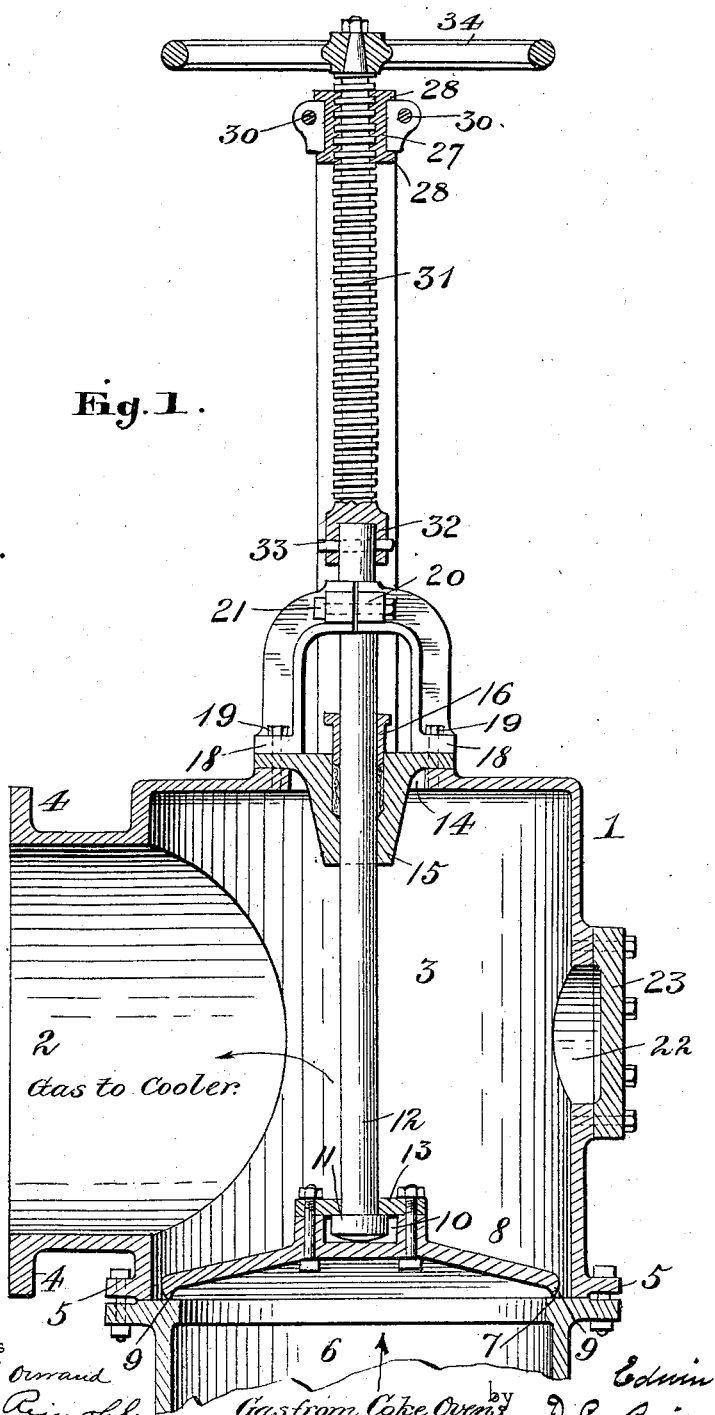
Figure 2:
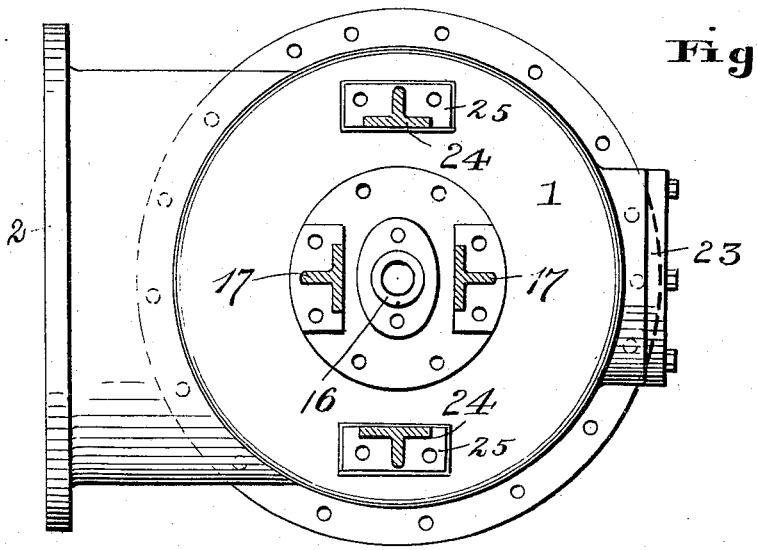
Figure 4:
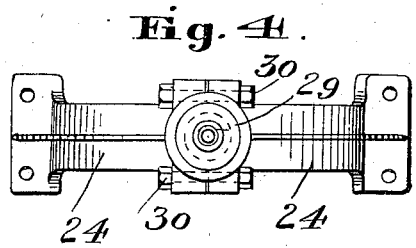
Figure 5:
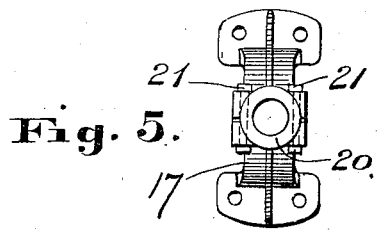
Figure 3:
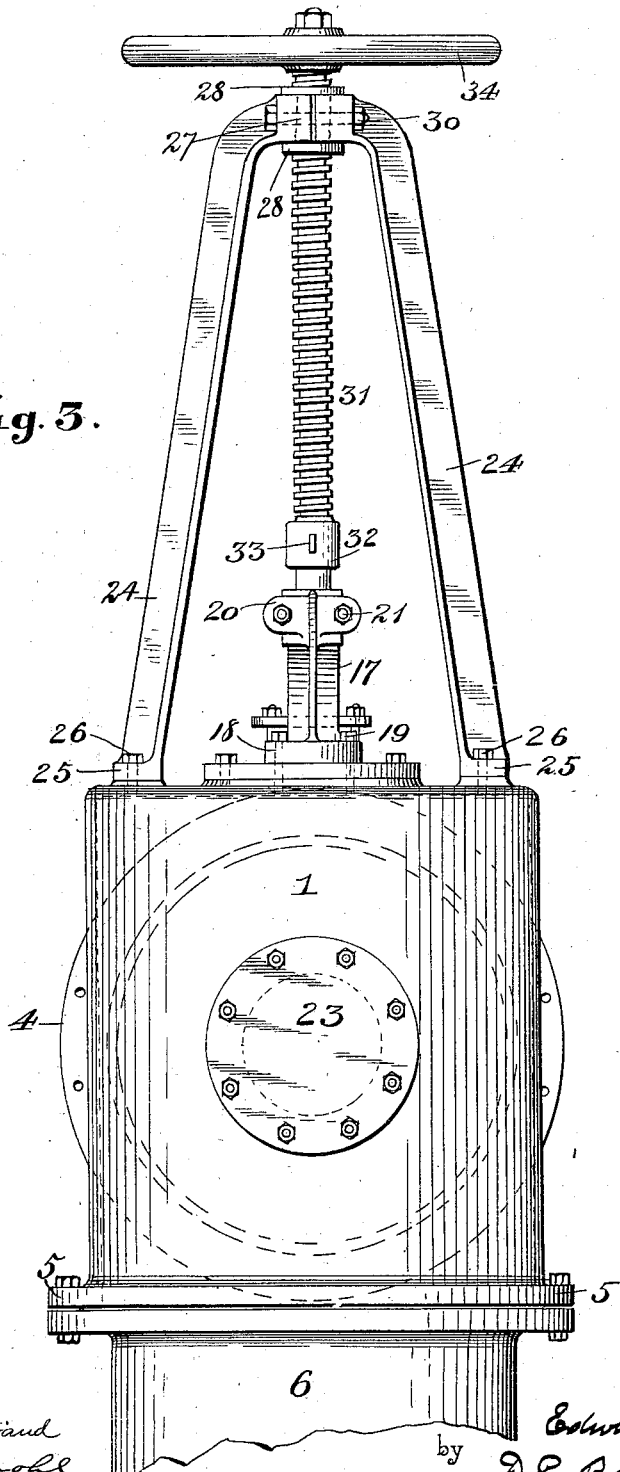

In the accompanying drawings, which form part of this specification, Figure 1 represents a vertical section of a valve embodying my invention; Fig. 2, a top plan view, partly in section; Fig. 3, an end elevation; Fig. 4, a top plan of the clamping-yoke for the valve-stem, and Fig. 5 a like view of the valve-operating yoke.

Reference being had to the drawings and the numerals thereon, 1 indicates the case or body of the valve, having passages 2 and 3 at a right angle to each other, which are provided with flanges 4 and 5 for connecting the valve to a section of pipe 6 by the flange 5 and to a cooler (not shown) by the flange 4. The valve-body is without a valve-seat, which relieves the chamber in the valve-body of any projections or other obstructions on which coal-tar can accumulate and which will require chucking of the valve-case on a lathe to finish the seat; but instead thereof the pipe 6 has a valve-seat 7 formed on one end thereof, which is engaged by a valve 8, having a knife-edge bearing-surface 9, which impinges upon the seat 7 to control the passage of gas through the valve-body with the least possible resistance. The valve is preferably concavo-convex in cross-section and is provided with a pocket 10 to receive the head 11 of the valve-rod 12, which is secured by a cap 13.

14 is an opening in the valve-body to receive a stuffing-box 15, through which the valve stem or rod 12 passes, and is surrounded by a gland 16. The valve-stem is a plain round body without screw-threads and is provided with a clamping-yoke 17, made in two parts, whose flanges 18 are permanently secured to the top of the valve-body by bolts 19 and whose head 20 engages the valve-stem and holds the valve in any position it is placed by the friction produced by the bolts 21 in the flanges of said head.

22 is an opening in the valve-body for the insertion of a bar upon which a tool (not shown) is secured for turning off or finishing the face of the flange 4 to make a tight joint and for the purpose of removing tar which may accumulate upon the valve-seat 7 or upon the valve 8 and is provided with a removable cap or bonnet 23.

24 indicates the valve-operating yoke, also made in two parts, each part being provided with a foot or flange 25, by which it is detachably secured to the top of the valve by bolts 26, and is provided with an internally-screw-threaded nut 27, having flanges 28 thereon, and is secured to the head 29 of the yoke by bolts 30 in the flanges of said head, and the nut 27 is engaged by a screw-threaded rod, stem, or spindle 31, having a socket 32 in its lower end, which engages the upper end of the valve-stem 12 and is secured thereto by a key 33 or in any other suitable manner, and the upper end of the rod 31 is provided with a hand-wheel 34 for operating the valve.

In the practical use of gas-valves in the cooling of gas, one valve-operating yoke will serve all the valves used in the cooling system by using the yoke to open or close one valve and then remove the yoke and apply it to another valve successively until all the valves have been opened or closed, thus dispensing with a fixed or permanent operating-yoke for each valve in the system.

The valve is inserted by raising the valve-body 1 and seating the valve on the end of pipe-section 6, which allows the use of a small bonnet or stuffing-box opening 14, through which a bar is inserted and provided with a tool for finishing the face of the flange 5 in like manner as flange 4 is finished.

Having thus fully described my invention, what I claim is—

1. A valve having a permanent clamping-yoke, a valve-stem frictionally engaged by said yoke to support the valve in raised position, a separate valve-operating yoke detachably secured to the valve-case, and a screw-threaded valve-operating rod engaged by a nut in the latter yoke.

2. A valve having a smooth valve-stem, a two-part yoke permanently secured to the valve-case and provided with a clamping-head engaging said valve-stem, in combination with a screw-threaded valve-operating spindle, a two-part valve-operating yoke detachably secured to the valve-case and provided with a nut engaging said spindle.

In testimony whereof I affix my signature in presence of two witnesses.

EDWIN A. MOORE.

Witnesses:
D. C. REINOHL,
C. W. METCALFE.